United States Patent
Wei et al.

(10) Patent No.: US 11,619,499 B2
(45) Date of Patent: Apr. 4, 2023

(54) ELECTRIC VEHICLE NAVIGATION METHOD AND SYSTEM BASED ON POWER GUIDANCE OF ENERGY-STORAGE CHARGING PILE

(71) Applicants: Tao Wei, Guangxi (CN); Jingwen Huang, Guangxi (CN); Jiaren Luo, Guangxi (CN); Jin Liu, Guangxi (CN)

(72) Inventors: Tao Wei, Guangxi (CN); Jingwen Huang, Guangxi (CN); Jiaren Luo, Guangxi (CN); Jin Liu, Guangxi (CN)

(*) Notice: Subject to any disclaimer, the term of this patent is extended or adjusted under 35 U.S.C. 154(b) by 248 days.

(21) Appl. No.: 16/914,447

(22) Filed: Jun. 28, 2020

(65) Prior Publication Data

US 2020/0378770 A1    Dec. 3, 2020

Related U.S. Application Data

(63) Continuation of application No. PCT/CN2018/121459, filed on Dec. 17, 2018.

(30) Foreign Application Priority Data

Dec. 28, 2017 (CN) .......................... 201711463873.6

(51) Int. Cl.
*G01C 21/34* (2006.01)
*B60L 53/51* (2019.01)
(Continued)

(52) U.S. Cl.
CPC .......... *G01C 21/3407* (2013.01); *B60L 53/51* (2019.02); *B60L 53/52* (2019.02); *B60L 58/12* (2019.02); *G01C 21/3469* (2013.01)

(58) Field of Classification Search
CPC ............ G01C 21/3407; G01C 21/3469; B60L 53/51; B60L 53/52; B60L 58/12
(Continued)

(56) References Cited

U.S. PATENT DOCUMENTS 8,452,642 B2 * 5/2013 Matsuyama ........... G06Q 50/06
705/13
2011/0191266 A1    8/2011 Matsuyama

FOREIGN PATENT DOCUMENTS

CN    101779099 A    7/2010
CN    104182492 A    12/2014
(Continued)

*Primary Examiner* — Hal Kaplan

(57) ABSTRACT

The present invention discloses a navigation method for electric vehicles based on electricity quantity guidance of energy-storage charging piles. The electric vehicles select charging piles nearby that can meet own charging quantity demands to charge according to location information of charging piles and real-time stored electricity information of energy storage modules of the charging piles; a system using the method includes the charging piles. The navigation method and system can reasonably guide the electric vehicles to charge according to the distribution and the stored electricity of the charging piles, and can dynamically plan travel charging solutions for the electric vehicles, thereby avoiding problems that the electric vehicles stop running without electricity on the way to the charging piles and inefficiently wait for charging for a long time, so that the stored electricity of the charging piles can be reasonably distributed and utilized, and energy idleness and waste are avoided.

9 Claims, 3 Drawing Sheets

(51) Int. Cl.
  *B60L 58/12* (2019.01)
  *B60L 53/52* (2019.01)
(58) Field of Classification Search
  USPC .......................................................... 701/410
  See application file for complete search history.

(56) References Cited

FOREIGN PATENT DOCUMENTS

| | | |
|---|---|---|
| CN | 205615350 U | 10/2016 |
| CN | 205686206 U | 11/2016 |
| CN | 205992767 U | 3/2017 |
| CN | 106926724 A | 7/2017 |
| CN | 107953798 A | 4/2018 |

\* cited by examiner

ELECTRIC VEHICLE NAVIGATION METHOD AND SYSTEM BASED ON POWER GUIDANCE OF ENERGY-STORAGE CHARGING PILE

TECHNICAL FIELD

The present invention relates to the field of electric vehicle charging navigation, in particular to a navigation method and system for electric vehicles based on electricity quantity guidance of energy-storage charging piles.

BACKGROUND OF THE PRESENT INVENTION

With the deepening of the concept of green environmental protection in the world, electric vehicles, including electromobiles, unmanned aerial vehicles and the like, are developing rapidly. However, the main problems that limit the promotion of electric vehicles, particularly the electromobiles, include short endurance mileage and incomplete charging and recharging facilities, which often cause that the electromobiles are often short of electricity on the way and unable to be recharged in time, bringing troubles to users. In urban suburbs, vast rural areas and wilderness areas, the problem that the electromobiles are unable to go out of the city and go to the countryside is particularly prominent due to the lack of charging facilities. The existing electromobile charging navigation only gives a charging point on the electronic map and plans a route to reach the charging point quickly without considering the electricity quantity of some energy-storage charging piles in a charging station, which is easy to cause inefficient waiting for a long time at the empty-electricity energy-storage charging piles. However, an energy-storage charging device based on clean energy street lamps, which is developed vigorously in rural areas and is operated off the power grid, cannot be effectively utilized in the charging and recharging field due to the difficulty in knowing the stored electricity.

The unmanned aerial vehicles and electric ships driven by batteries are also unable to select charging time and places reasonably due to the lack of charging facilities and the inability to know the stored electricity of the energy-storage charging piles, thereby affecting the work efficiency due to short endurance mileage and frequent back-and-forth charging.

SUMMARY OF THE PRESENT INVENTION

Technical Problems

The present invention provides a navigation method and system for electric vehicles based on electricity quantity guidance of energy-storage charging piles. The navigation method and system can select charging piles nearby that can meet own charging quantity demands to charge according to the own remaining electricity quantity and energy consumption of the electric vehicles and in combination with the distribution and energy storage of the energy-storage charging piles, and can dynamically plan travel charging solutions for the electric vehicles, thereby avoiding problems that the electric vehicles stop running without electricity on the way to the charging piles and inefficiently wait for charging for a long time, so that the stored electricity of the charging piles can be reasonably distributed and utilized, and energy idleness and waste are avoided.

SOLUTIONS TO PROBLEMS

Technical Solutions

The present invention is realized by the following technical solutions:

A navigation method for electric vehicles based on electricity quantity guidance of energy-storage charging piles, wherein the charging piles are provided with energy storage modules; and the electric vehicles select charging piles nearby that can meet own charging quantity demands to charge according to location information of the charging piles and real-time stored electricity information of the energy storage modules of the charging piles.

The navigation method further includes a step that a navigation module guides each electric vehicle to one charging pile for charging. Specifically, the charging pile sends location information and real-time stored electricity information of the charging pile to the navigation module; and the navigation module guides the electric vehicle to the charging pile nearby that can meet the own charging quantity demands to charge according to the received location information of the charging pile and real-time stored electricity information of the energy storage module of the charging pile.

The navigation method further includes a step that an electricity quantity navigation server and the navigation module cooperate with each other to guide the electric vehicle to the charging pile for charging. Specifically, the charging pile sends the location information of the charging pile and the real-time stored electricity information of the energy storage module of the charging pile to the electricity quantity navigation server; the electric vehicle sends real-time location information and charging quantity demands of the electric vehicle to the electricity quantity navigation server through the navigation module; the electricity quantity navigation server matches the charging pile nearby that can meet the charging quantity demands of the electric vehicle and sends the location information of the matched charging pile and the real-time stored electricity information of the energy storage module of the matched charging pile to the navigation module; and the navigation module guides the electric vehicle to charge.

The navigation method further includes a step that the electricity quantity navigation server formulates a charging planning solution for the electric vehicle. Specifically, the charging pile sends self-state detection information to the electricity quantity navigation server, wherein the self-state detection information includes the location information of the charging pile and the real-time stored electricity information of the energy storage module of the charging pile; the electric vehicle sends destination information and real-time remaining electricity quantity and energy consumption information of the electric vehicle to the electricity quantity navigation server through the navigation module; the electricity quantity navigation server formulates the charging planning solution according to the received information and sends the charging planning solution to the navigation module; and the navigation module guides the electric vehicle to the designated charging pile for charging according to the charging planning solution.

The navigation method further includes a step that the electricity quantity navigation server dynamically plans a travel charging solution for the electric vehicle.

Specifically, the charging pile sends the self-state detection information to the electricity quantity navigation server, wherein the self-state detection information includes the location information of the charging pile and the real-time stored quantity information of the energy storage module of the charging pile; the electric vehicle sends the destination information and the electricity quantity and energy consumption information of the electric vehicle to the electricity quantity navigation server through the navigation module; the electricity quantity navigation server acquires meteorological information of a region where the charging pile is located, respectively predicts storage time of the energy storage module of the charging pile, charging time of the electric vehicle, energy consumption of a route and average driving time through analysis, dynamically plans the travel charging solution, predicts the whole time consumption of the electric vehicle, and provides the solutions to the navigation module; and the navigation module guides the electric vehicle to travel according to the travel charging solution.

A navigation system for electric vehicles based on electricity quantity guidance of energy-storage charging piles adopts the navigation method for electric vehicles based on electricity quantity guidance of energy-storage charging piles, wherein each charging pile is provided with a control module, a positioning module, an energy storage module and a communication module; each electric vehicle is provided with a communication unit; and the control module respectively collects positioning information of the positioning module and stored electricity information of the energy storage module in real time, and sends the information to the communication unit of the electric vehicle through the communication module.

The navigation system further includes a navigation module, which is connected with the communication unit of the electric vehicle.

The navigation system further includes an electricity quantity navigation server, wherein the navigation module is connected with the electricity quantity navigation server through the communication unit; and the control module of the charging pile is connected with the electricity quantity navigation server through the communication module.

Each charging pile is also provided with a meteorological monitoring unit, which is connected with the control module of the charging pile; a control switch is electrically connected between a power supply of the energy storage module and the energy storage module; and the control switch is controlled by the control module of the charging pile. Each charging pile is also provided with a self-state monitoring unit, which monitors temperature, electricity quantity and electric parameters of an input end and an output end of the energy storage module of the charging pile in real time and sends to the electricity quantity navigation server through the control module.

The charging piles may be power grid-powered charging piles with energy storage modules, new energy charging piles with energy storage modules and energy-storage charging piles attached to distributed new energy street lamps, wherein the new energy refers to wind power generation, solar power generation, tidal power generation, hydroelectric generation or combustible gas power generation; the power supply of each energy storage module is one or more of a power grid, a wind power generation device, a solar power generation device, a tidal power generation device, a hydroelectric generation device and a combustible gas power generation device; and the charging piles are provided with one or two of alternating current (AC) charging interfaces and direct current (DC) charging interfaces.

Beneficial Effects of the Present Invention
Beneficial Effects

The present invention has the advantages as follows.
1. The method and system provided by the present invention have strong adaptability, can be widely used for charging the electric vehicles including the electromobiles, the unmanned aerial vehicles, the electric ships and the like, and integrates various energy-storage charging piles, particularly the distributed new energy charging piles unstable in electricity quantity, thereby greatly expanding the distribution range of charging facilities of the electric vehicles.
2. The method and system provided by the present invention can intelligently navigate and control the charging after reasonably planning the charging solution according to the remaining electricity quantity and energy consumption of the electric vehicles and in combination with the distribution and energy storage conditions of the energy-storage charging piles, thereby improving the charging efficiency, effectively extending the endurance mileage of the electric vehicles, also reasonably distributing and utilizing the stored electricity of the charging piles, and avoiding energy idleness and waste.
3. The method and the system provided by the present invention can intelligently select the power supply of the energy storage module of each charging pile according to the meteorological information, ensure the electricity quantity of the energy storage module and prolong the service life.
4. The method and system provided by the present invention can dynamically plan the travel charging solution for the electric vehicles, thereby avoiding the problems that the electric vehicles stop running without electricity and inefficiently wait for charging for a long time, and ensuring that the electric vehicles successfully complete the journey with low cost and high timeliness.

BRIEF DESCRIPTION OF THE DRAWINGS

Description of the Drawings

Figure 1:
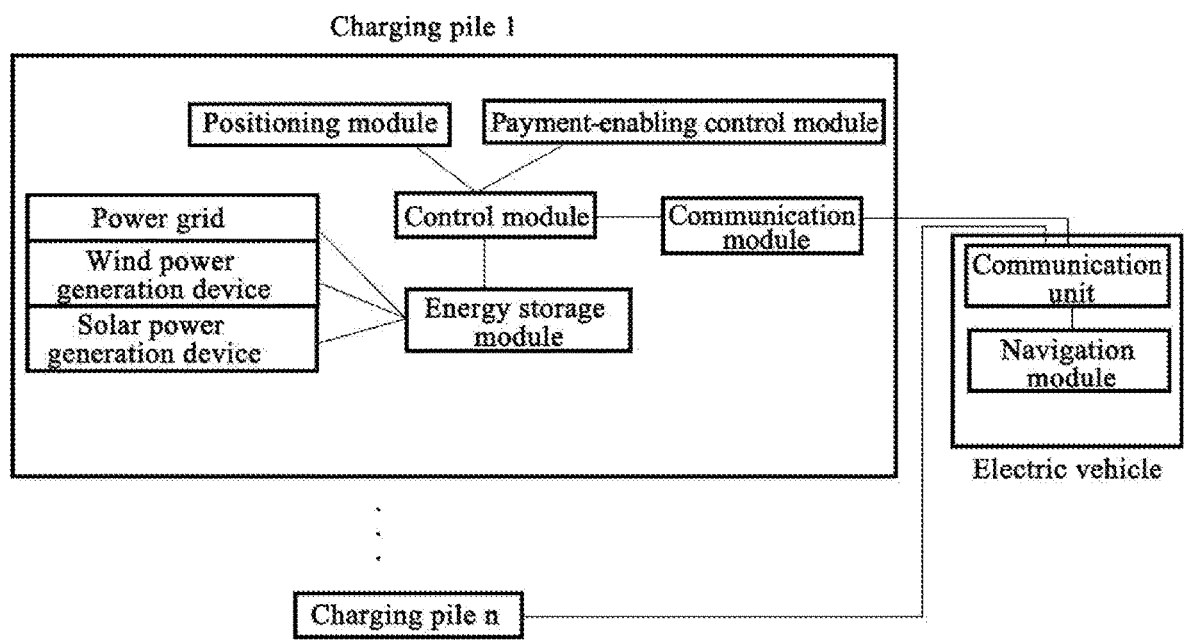
Figure 2:
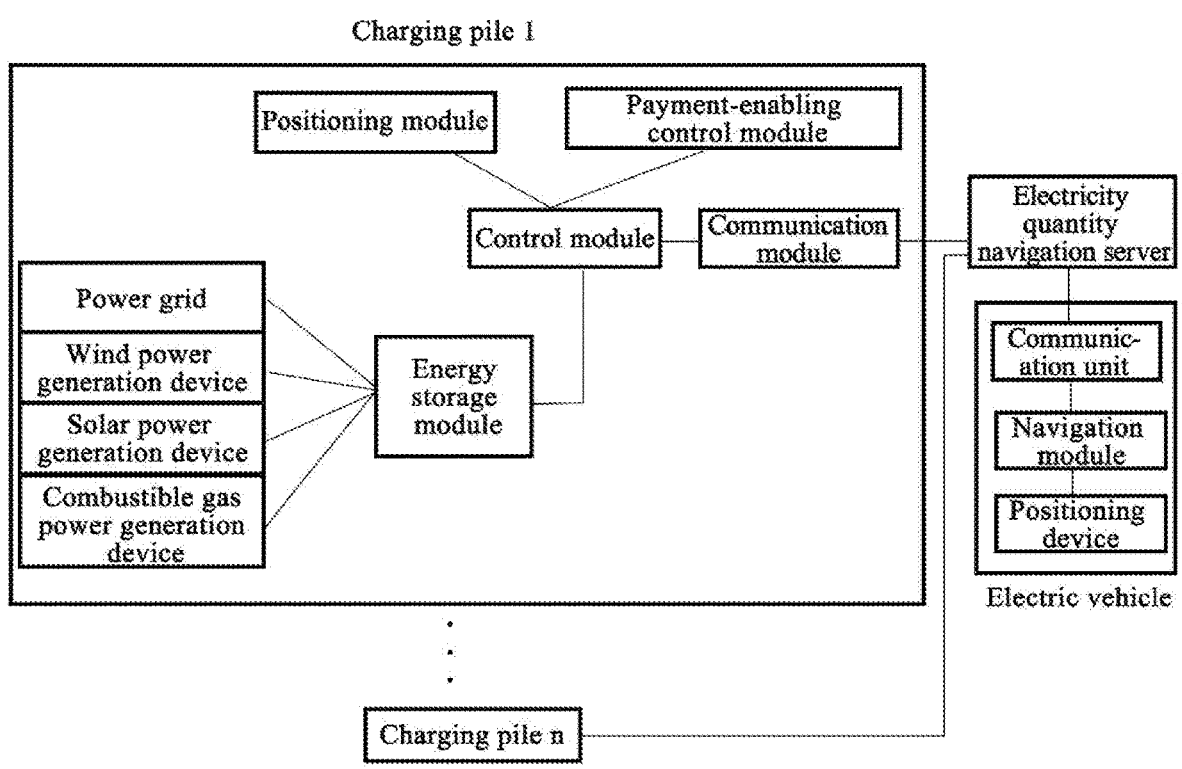
Figure 3:
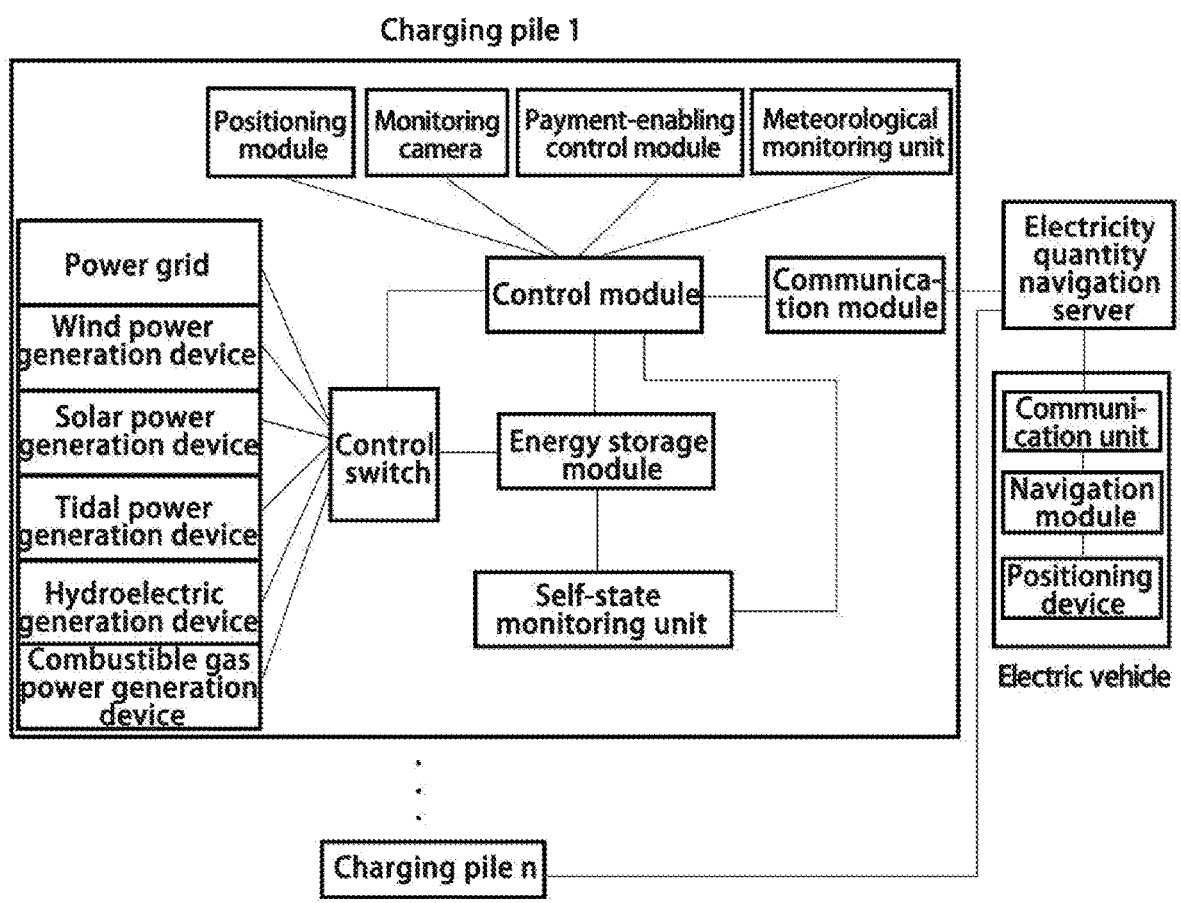

FIG. 1 is a frame schematic diagram of a system according to an embodiment 1 of the present invention;
FIG. 2 is a frame schematic diagram of a system according to embodiments 2 and 3 of the present invention; and
FIG. 3 is a frame schematic diagram of a system according to an embodiment 4 of the present invention.

PREFERRED EMBODIMENTS OF THE PRESENT INVENTION

Detailed Description of the Present Invention

The technical solutions of the present invention will be described in detail below with reference to embodiments and the accompanying drawings, but do not constitute a limitation on the protection scope of claims of the present invention.

Embodiment 1

As shown in FIG. 1, a navigation system for electric vehicles based on electricity quantity guidance of energy-storage charging piles is provided; and the electric vehicles include electromobiles, unmanned aerial vehicles or electric ships. A plurality of charging piles are provided, and include power grid-powered charging piles with energy storage modules, new energy charging piles with energy storage modules and energy-storage charging piles attached to distributed new energy street lamps. A power supply of each energy storage module is one or more of a power grid, a wind power generation device, a solar power generation device, a tidal power generation device, a hydroelectric generation device and a combustible gas power generation device. The energy storage modules are used for storing electric energy, e.g., storage batteries or supercapacitors are used. The charging piles are provided with one or two of AC charging interfaces and DC charging interfaces, and can also be selectively provided with charging interfaces special for the unmanned aerial vehicles.

Each charging pile is provided with a control module, a positioning module, an energy storage module and a communication module. Each electric vehicle is provided with a communication unit. The control module respectively collects positioning information of the positioning module and stored electricity information of the energy storage module in real time, and sends the information to the communication unit of the electric vehicle through the communication module in a wired or wireless connection manner.

Each electric vehicle judges idle states of the corresponding charging piles according to location information of the charging pile and real-time stored electricity information of the energy storage module of the charging pile received by the communication unit, own remaining electricity and real-time stored electricity information of the energy storage module, and selects the charging pile nearby that can meet own charging quantity demands to charge.

To realize intelligent navigation, a navigation module can also be arranged in each electric vehicle. The communication unit transmits the received location information of the charging pile and the real-time stored electricity information of the energy storage module of the charging pile to the navigation module. Meanwhile, the navigation module receives the remaining electricity quantity information and positioning information of the electric vehicle. The navigation module judges the charging pile nearby that is idle and can meet own charging quantity demands according to the received information, and guides the electric vehicle to the charging pile nearby for charging through an electronic map or geographical coordinates loaded on the navigation module.

Embodiment 2

As shown in FIG. 2, a navigation system for electric vehicles based on electricity quantity guidance of energy-storage charging piles is provided; and the electric vehicles include electromobiles, unmanned aerial vehicles or electric ships. A plurality of charging piles are provided, and include power grid-powered charging piles with energy storage modules, new energy charging piles with energy storage modules and energy-storage charging piles attached to distributed new energy street lamps. A power supply of each energy storage module is one or more of a power grid, a wind power generation device, a solar power generation device, a tidal power generation device, a hydroelectric generation device and a combustible gas power generation device. The energy storage modules are used for storing electric energy, e.g., storage batteries or supercapacitors are used. The charging piles are provided with one or two of AC charging interfaces and DC charging interfaces, and can also be selectively provided with charging interfaces special for the unmanned aerial vehicles.

The navigation system provided by the present invention further includes an electricity quantity navigation server. Each charging pile is provided with a control module, a positioning module, an energy storage module and a communication module. The control module respectively collects positioning information of the positioning module and stored electricity information of the energy storage module in real time, and sends the information to the electricity quantity navigation server through the communication module in a wired or wireless connection manner.

Each electric vehicle is provided with a navigation module, a communication unit and a positioning device, wherein the navigation module is connected with the communication unit. The navigation module collects the remaining electricity quantity information of a storage battery and positioning information of the electric vehicle, and sends the information to the electricity quantity navigation server through the communication unit. The electricity quantity navigation server judges an idle state of the corresponding charging piles according to the received real-time stored electricity information of the energy storage module of the charging pile, matches the charging pile nearby that can meet the charging quantity demands for the electric vehicle, and sends location information of the matched charging pile and the real-time stored electricity information of the energy storage module of the matched charging pile to the navigation module. Then, the navigation module guides the electric vehicle to the matched charging pile for charging through an electronic map.

Embodiment 3

As shown in FIG. 2, a navigation system for electric vehicles based on electricity quantity guidance of energy-storage charging piles is constructed as the Embodiment 2.

To improve the efficiency of electricity quantity navigation, the navigation module simultaneously sends destination information or work schedule planning of each electric vehicle, as well as elements of electricity quantity information and energy consumption information of a storage battery of the electric vehicle such as model and load of the electric vehicle to the electricity quantity navigation server. The electricity quantity navigation server calculates the energy consumption of the electric vehicle, deduces and predicts the endurance mileage of the electric vehicle, formulates a charging planning solution according to the real-time stored electricity information of the charging pile nearby, and sends the charging planning solution to the navigation module. The navigation module guides the electric vehicle to the energy-storage charging pile designated by the charging planning solution for charging through the electronic map or geographical coordinates, thereby ensuring that the electric vehicle can reach the next charging pile capable of providing charging quantity before the storage battery runs out.

Embodiment 4

As shown in FIG. 3, a navigation system for electric vehicles based on electricity quantity guidance of energy-storage charging piles is provided; and the electric vehicles include electromobiles, unmanned aerial vehicles or electric ships. A plurality of charging piles are provided, and include power grid-powered charging piles with energy storage modules, new energy charging piles with energy storage modules and energy-storage charging piles attached to distributed new energy street lamps. A power supply of each energy storage module is one or more of a power grid, a wind power generation device, a solar power generation device, a tidal power generation device, a hydroelectric generation device and a combustible gas power generation device. The energy storage modules are used for storing electric energy, e.g., storage batteries or supercapacitors are used. The charging piles are provided with one or two of AC charging interfaces and DC charging interfaces, and can also be selectively provided with charging interfaces special for the unmanned aerial vehicles.

The navigation system provided by the present invention further includes an electricity quantity navigation server. Each charging pile is provided with a control module, a positioning module, an energy storage module and a communication module. The control module is respectively connected with the positioning module, the energy storage module and the communication module; and the communication module is connected with the electricity quantity navigation server in a wired or wireless connection manner. Each electric vehicle is provided with a navigation module, a communication unit and a positioning device, wherein the navigation module is connected with the communication unit.

In consideration of the influence of weather on the travel and charging of electric vehicles, each charging pile is also provided with a meteorological monitoring unit for monitoring local weather such as rain, snow, wind and sunshine. The meteorological monitoring unit is connected with the control module of each charging pile. A control switch is electrically connected between a power supply of the energy storage module and the energy storage module, wherein a control end of the control switch is connected with the control module of the charging pile. The meteorological monitoring unit sends the monitored meteorological information to the control module of the charging pile; and the control module sends the meteorological information to the electricity quantity navigation server. Meanwhile, the control module selects the corresponding power supply to charge the energy storage module by controlling the control switch in combination with the received real-time stored electricity information of the energy storage module, e.g., the solar power generation device is selected to charge the energy storage module by the control switch in the case of sunny day with strong sunshine and weak wind.

Each charging pile is also provided with a self-state monitoring unit, which monitors temperature, electricity quantity, electric parameters such as voltage and current of an input end and an output end, and other self-state detection information of the energy storage module of the charging pile in real time and sends to the control module. The control module sends the received self-state detection information of the energy storage module to the electricity quantity navigation server.

The navigation system provided by the present invention is utilized to provide a dynamic travel charging solution for each electric vehicle.

Each electric vehicle sends a travel destination, model and positioning information of the electric vehicle, electricity quantity state information of a storage battery of the electric vehicle, as well as load, energy consumption and other information of the electric vehicle to the electricity quantity navigation server. The electric quantity navigation server integrates various received information, combines traffic condition information, applies big data analysis on the basis of a large number of historical working data of electric vehicle, predicts the storage time and the storage progress of the charging pile under meteorological conditions for a period of time in the future, dynamically plans a reasonable travel charging solution for the electric vehicle, and predicts the whole time consumption of the electric vehicle. The navigation module guides the electric vehicle to travel through an electronic map according to the travel charging solution provided by the electricity quantity navigation server. The travel charging solution can meet the battery life requirements of the electric vehicle in the whole travel process. Meanwhile, the stored electricity of the charging piles is effectively and orderly utilized in time through reasonable planning and scheduling.

In the Embodiments 1-4, each charging pile is further provided with a payment-enabling control module, which is connected with the control module. A user can pay to purchase charging quantity on site through the payment-enabling control module to charge the electric vehicle quantitatively. In the Embodiment 4, the following payment modes can also be adopted: the electricity quantity navigation server provides the planned charging quantity of the electric vehicle to an operation platform; the operation platform charges the user according to the planned charging quantity and feeds charged information back to the electricity quantity navigation server; and the electricity quantity navigation server controls the payment-enabling control module to enable the quantitative charging service through the control module of the charging pile. The electricity sold to the designated electric vehicle will not be sold to other electric vehicles for charging.

To improve the monitoring, each charging pile is also provided with a user detection module such as a monitoring camera, an infrared monitoring device, WIFI, Bluetooth or radar, for determining a proximity state and a working state of each electric vehicle and each charging pile.

The navigation system provided by the present invention can also be used for tourism promotion, social activities, commercial activities and other applications by embedding the interface of the power navigation server into related application software, such as tourism electronic maps, social electronic maps, commercial electronic maps and service robot management software.

What is claimed is:

1. A navigation method for an electric vehicle, the method comprising:
   selecting, from a plurality of charging piles around the electric vehicle, a target charging pile that meets a charging quantity demand of the electric vehicle based on location information of the charging piles and real-time stored electricity information of energy storage modules of the charging piles; and
   guiding the electric vehicle to the target charging pile for charging.

2. The navigation method of claim 1, further comprising:
   providing a navigation module; and
   guiding, by the navigation module, the electric vehicle to the target charging pile for charging;
   wherein the step of "guiding, by the navigation module, the electric vehicle to the target charging pile for charging" comprises:
   receiving, by the navigation module, location information and real-time stored electricity information of the target charging pile; and
   guiding, by the navigation module, the electric vehicle to the target charging pile for charging according to received location information and real-time stored electricity information of the target charging pile.

3. The navigation method of claim 1, further comprising:
providing an navigation module and an electricity quantity navigation server, wherein the navigation module and the electricity quantity navigation server cooperate with each other to guide the electric vehicle to the target charging pile;
sending, by the charging piles, the location information of the charging piles and the real-time stored electricity information of the energy storage modules of the charging piles around the electric vehicle to the electricity quantity navigation server;
sending real-time location information and the charging quantity demand of the electric vehicle to the electricity quantity navigation server through the navigation module;
selecting, by the electricity quantity navigation server, the target charging pile that meets the charging quantity demand of the electric vehicle;
sending, by the electricity quantity navigation server, location information and real-time stored electricity information of the target charging pile to the navigation module; and
guiding, by the navigation module, the electric vehicle to the target charging pile for charging.

4. The navigation method of claim 3, further comprising a step of formulating, by the electricity quantity navigation server, a charging planning solution for the electric vehicle;
wherein the step of "formulating, by the electricity quantity navigation server, a charging planning solution for the electric vehicle" comprises:
sending, by the charging piles, self-state detection information of the charging piles to the electricity quantity navigation server, wherein the self-state detection information comprises the location information and the real-time stored electricity information of the charging piles;
sending, by the navigation module, destination information, and real-time remaining electricity quantity and energy consumption information of the electric vehicle to the electricity quantity navigation server;
formulating, by the electricity quantity navigation server, the charging planning solution according to the destination information, and the real-time remaining electricity quantity and energy consumption information of the electric vehicle;
sending, by the electricity quantity navigation server, the charging planning solution to the navigation module; and
guiding, by the navigation module, the electric vehicle to the target charging pile according to the charging planning solution.

5. The navigation method of claim 3, further comprising a step of dynamically planning, by the electricity quantity navigation server, a travel charging solution for the electric vehicle;
wherein the step of "dynamically planning, by the electricity quantity navigation server, a travel charging solution for the electric vehicle" comprises:
sending, by the charging piles, self-state detection information to the electricity quantity navigation server, wherein the self-state detection information comprises the location information and the real-time stored quantity information of the charging piles;
sending, by the navigation module, destination information and electricity quantity and energy consumption information of the electric vehicle to the electricity quantity navigation server;
acquiring, by the electricity quantity navigation server, meteorological information around the target charging pile;
predicting, by the electricity quantity navigation server, storage time of the target charging pile, charging time of the electric vehicle, energy consumption and average driving time;
dynamically planning, by the electricity quantity navigation server, the travel charging solution;
predicting, by the electricity quantity navigation server, time consumption of the electric vehicle to arrive at the target charging pile;
sending, by the electricity quantity navigation server, the travel charging solution to the navigation module; and
guiding, by the navigation module, the electric vehicle to the target charging pile according to the travel charging solution.

6. A navigation system for an electric vehicle for implementing the navigation method of claim 1, the system comprising:
a control module;
a positioning module;
an energy storage module;
a communication module; and
a communication unit provided in the electric vehicle;
wherein the control module, the positioning module, the energy storage module and the communication module are provided in each of the charging piles;
the control module is configured to collect positioning information of the positioning module and real-time stored electricity information of the energy storage module of the charging pile, and is configured to send to the communication unit the positioning information of the positioning module and the real-time stored electricity information of the energy storage module of the charging pile.

7. The navigation system of claim 6, further comprising a navigation module connected to the communication unit of the electric vehicle.

8. The navigation system of claim 7, further comprising an electricity quantity navigation server;
wherein the navigation module is connected to the electricity quantity navigation server through the communication unit; and the control module is connected to the electricity quantity navigation server through the communication module.

9. The navigation system of claim 8, wherein a meteorological monitoring unit is provided in each of the charging piles; the meteorological monitoring unit is connected to the control module of the charging pile;
a control switch is electrically connected to a power supply of each of the energy storage modules, and is controlled by the control module of the charging pile; and
a self-state monitoring unit is provided in each of the charging piles; and the self-state monitoring unit is configured to monitor self-state detection information of the charging pile in real time and send the self-state detection information to the electricity quantity navigation server through the control module, wherein the self-state detection information comprises temperature, electricity quantity and electric parameters of an input end and an output end of each of the energy storage modules.

* * * * *